May 15, 1934.  T. H. SYMINGTON  1,958,806
LATERAL MOTION TRUCK
Filed Dec. 2, 1929  3 Sheets-Sheet 1
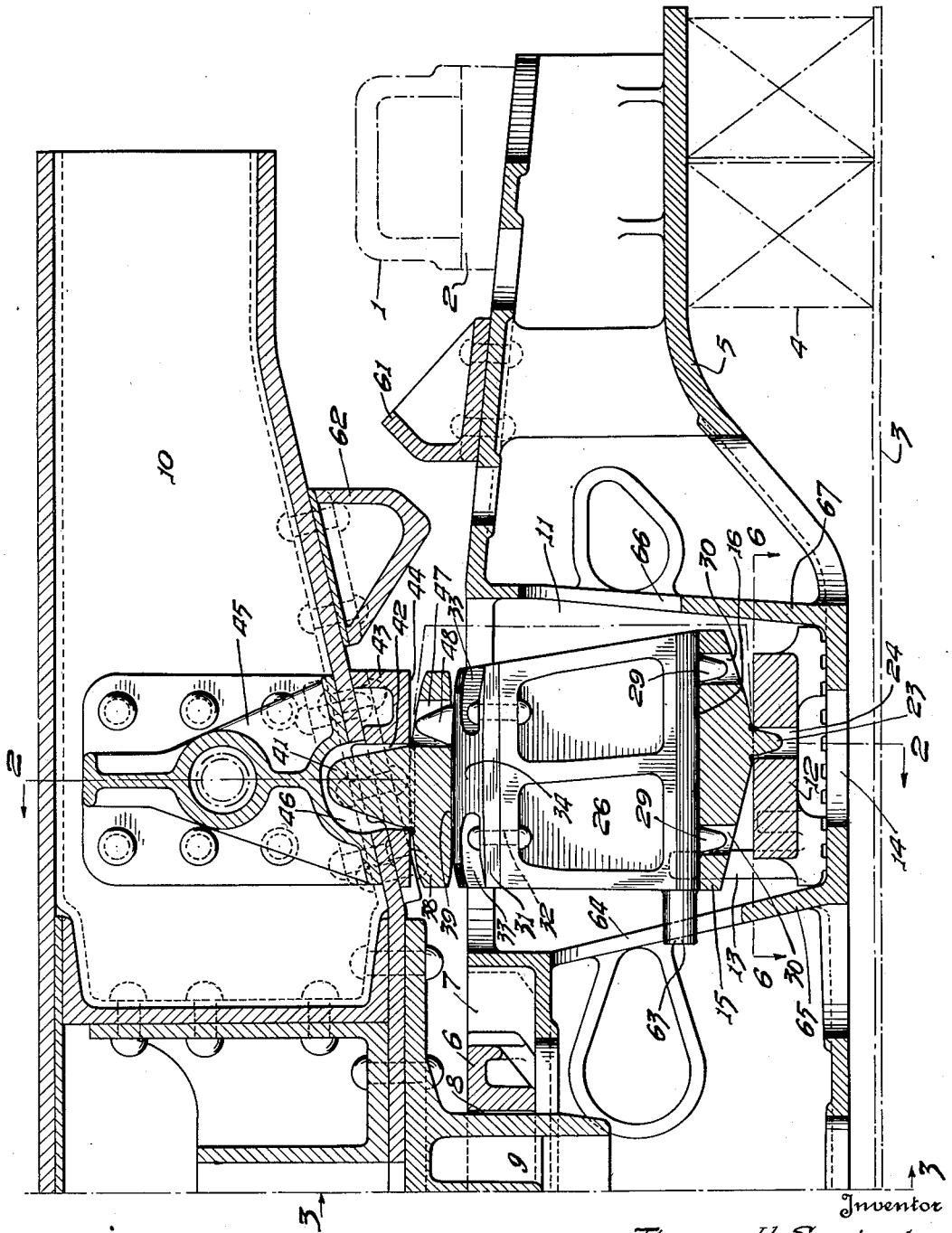

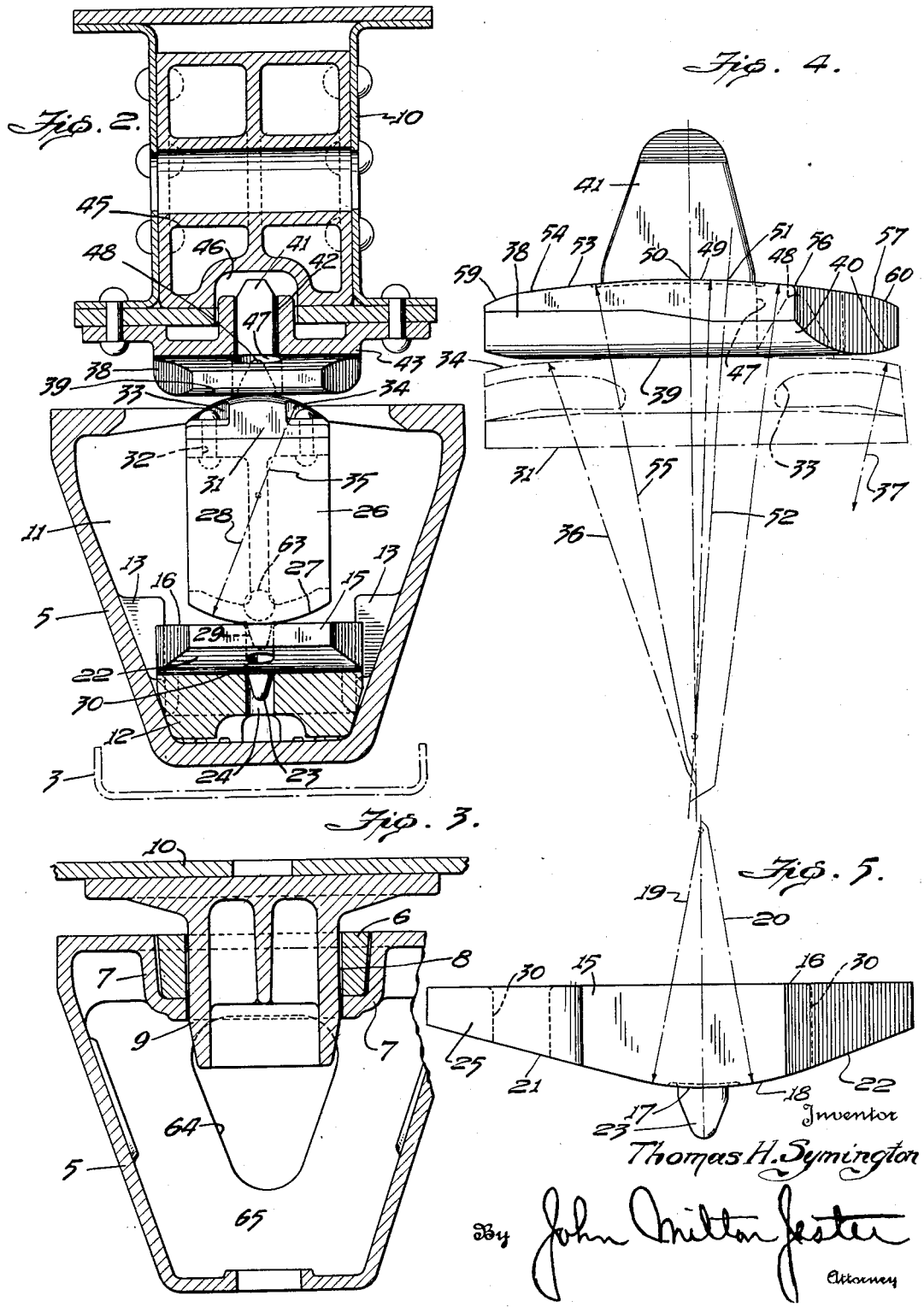

Patented May 15, 1934

1,958,806

UNITED STATES PATENT OFFICE 1,958,806

LATERAL MOTION TRUCK

Thomas H. Symington, Baltimore, Md., assignor to T. H. Symington & Son, Inc., Baltimore, Md., a corporation of Maryland Application December 2, 1929, Serial No. 411,093

28 Claims. (Cl. 308—224)

The invention relates to railway car trucks, particularly to those designed for use in connection with freight cars, and has for its general object the provision of an improved truck embodying a novel bolster mounting whereby to permit relative swiveling movement of the truck and body bolster and at the same time to permit lateral motion of the body bolster.

It is well known that it is a common practice to provide a truck with rockers or rollers carried by the truck bolster and supporting the body bolster in such manner that the latter may have the combination of movements above mentioned. However, it has been attempted by various means to insure squaring of the wheels with respect to the truck and return of the body bolster to its normal or centered position with respect to the truck bolster after swiveling movement or lateral motion has occurred. The various expedients adopted for the purpose have been found to be faulty for the reason that too great a resistance is initially offered to either swiveling movement or lateral motion, this resulting in a tendency of the parts to slam after the resistance has been overcome, it frequently occurring that the body bolster moves with excessive violence toward one side frame or the other, as the case may be, depending upon the direction of curvature of the track. The violence of these movements is extremely detrimental not only to the parts of the truck itself but also to the car lading, especially in case the latter is of a perishable nature. In connection with passenger cars the problem is easily solved by a peculiar suspension means which can be employed but these methods cannot be followed in connection with freight car equipment.

It is with the above facts in view that I have devised the present invention, which has for an important object the provision of a truck embodying a rocker supporting means for the body bolster which will have the same general action as the suspension means in a passenger car truck, the rocker arrangement being such as to exert a lifting effect upon one end or the other of the body bolster when lateral motion occurs, this lifting effect counteracting the tendency of the body bolster to move.

It is another object of the invention to provide a rocker arrangement in which each side bearing assembly includes a plurality of parts so related that the lines and points of bearing with respect to the truck bolster and body bolster, respectively, will be at different distances from the vertical axis or center line of the truck, thereby obtaining the same effect as if use were made of upwardly converging suspension links such as are used in passenger car equipment, the various elements of the side bearing assembly having a peculiar curvature at certain faces or contacting surfaces to obtain the desired lifting effect opposing lateral motion and, if such is desired, also opposing relative swiveling movement without the employment of flat spots, as has, under certain conditions, been contemplated.

A further object of the invention is to provide a truck structure in which certain of the elements of the side bearing assembly may be formed of parts or sections of different relative hardness secured together so that while ordinary relatively soft steel castings may be utilized for the major portions, special steel parts may be built in to form the surfaces taking the maximum wear.

Another object of the invention is to provide a truck structure in which the parts subject to greatest wear are removable and capable of replacement after prolonged use in case such necessity arises.

And yet another object of the invention is to provide a structure of this type in which the parts are so constructed and related that incorrect assembly will be impossible, thereby preventing injury to the parts in the event of stupidity of a workman or mechanic employed in assembling.

Another important object of the invention is to provide a body bolster mounting which will have a free floating action and which will be devoid of extraneous means for effecting return of the parts, after relative movement, to their normal positions, reliance being placed upon the squaring effect of the wheels with respect to the truck and rails.

An additional object of the invention is to provide a side bearing assembly embodying the above mentioned advantageous characteristics and which may nevertheless be installed in an already existing truck bolster without the necessity of any changes or alterations therein, the expense of equipping a car with the improvement being consequently comparatively slight.

A further object is to provide a complete structure of this character which will itself be inexpensive to make, positive in action, efficient and durable in service, and a general improvement in the art.

To the attainment of the foregoing and other objects and advantages, the invention preferably consists in the arrangement, combination and construction of parts to be hereinafter more fully Patented May 15, 1934

1,958,806

UNITED STATES PATENT OFFICE 1,958,806

LATERAL MOTION TRUCK

Thomas H. Symington, Baltimore, Md., assignor to T. H. Symington & Son, Inc., Baltimore, Md., a corporation of Maryland Application December 2, 1929, Serial No. 411,093

28 Claims. (Cl. 308—224)

The invention relates to railway car trucks, particularly to those designed for use in connection with freight cars, and has for its general object the provision of an improved truck embodying a novel bolster mounting whereby to permit relative swiveling movement of the truck and body bolster and at the same time to permit lateral motion of the body bolster.

It is well known that it is a common practice to provide a truck with rockers or rollers carried by the truck bolster and supporting the body bolster in such manner that the latter may have the combination of movements above mentioned. However, it has been attempted by various means to insure squaring of the wheels with respect to the truck and return of the body bolster to its normal or centered position with respect to the truck bolster after swiveling movement or lateral motion has occurred. The various expedients adopted for the purpose have been found to be faulty for the reason that too great a resistance is initially offered to either swiveling movement or lateral motion, this resulting in a tendency of the parts to slam after the resistance has been overcome, it frequently occurring that the body bolster moves with excessive violence toward one side frame or the other, as the case may be, depending upon the direction of curvature of the track. The violence of these movements is extremely detrimental not only to the parts of the truck itself but also to the car lading, especially in case the latter is of a perishable nature. In connection with passenger cars the problem is easily solved by a peculiar suspension means which can be employed but these methods cannot be followed in connection with freight car equipment.

It is with the above facts in view that I have devised the present invention, which has for an important object the provision of a truck embodying a rocker supporting means for the body bolster which will have the same general action as the suspension means in a passenger car truck, the rocker arrangement being such as to exert a lifting effect upon one end or the other of the body bolster when lateral motion occurs, this lifting effect counteracting the tendency of the body bolster to move.

It is another object of the invention to provide a rocker arrangement in which each side bearing assembly includes a plurality of parts so related that the lines and points of bearing with respect to the truck bolster and body bolster, respectively, will be at different distances from the vertical axis or center line of the truck, thereby obtaining the same effect as if use were made of upwardly converging suspension links such as are used in passenger car equipment, the various elements of the side bearing assembly having a peculiar curvature at certain faces or contacting surfaces to obtain the desired lifting effect opposing lateral motion and, if such is desired, also opposing relative swiveling movement without the employment of flat spots, as has, under certain conditions, been contemplated.

A further object of the invention is to provide a truck structure in which certain of the elements of the side bearing assembly may be formed of parts or sections of different relative hardness secured together so that while ordinary relatively soft steel castings may be utilized for the major portions, special steel parts may be built in to form the surfaces taking the maximum wear.

Another object of the invention is to provide a truck structure in which the parts subject to greatest wear are removable and capable of replacement after prolonged use in case such necessity arises.

And yet another object of the invention is to provide a structure of this type in which the parts are so constructed and related that incorrect assembly will be impossible, thereby preventing injury to the parts in the event of stupidity of a workman or mechanic employed in assembling.

Another important object of the invention is to provide a body bolster mounting which will have a free floating action and which will be devoid of extraneous means for effecting return of the parts, after relative movement, to their normal positions, reliance being placed upon the squaring effect of the wheels with respect to the truck and rails.

An additional object of the invention is to provide a side bearing assembly embodying the above mentioned advantageous characteristics and which may nevertheless be installed in an already existing truck bolster without the necessity of any changes or alterations therein, the expense of equipping a car with the improvement being consequently comparatively slight.

A further object is to provide a complete structure of this character which will itself be inexpensive to make, positive in action, efficient and durable in service, and a general improvement in the art.

To the attainment of the foregoing and other objects and advantages, the invention preferably consists in the arrangement, combination and construction of parts to be hereinafter more fully described and claimed, and illustrated in the accompanying drawings, in which:

Figure 1 is a vertical sectional view across a car truck, or longitudinally of the bolsters showing the invention with the parts in normal position, Figure 2 is a vertical cross sectional view taken on substantially the line 2—2 of Figure 1, Figure 3 is a detail vertical section taken through the pivotal connection of the bolsters on substantially the line 3—3 of Figure 1, Figure 4 is an enlarged side elevation of the upper bearing member with the curved formation thereof illustrated in detail, Figure 5 is a similar view of the lower bearing member, Figure 6 is a horizontal cross section taken on the line 6—6 of Figure 1, Figure 7 is a top plan view of the upper bearing member, Figure 8 is a top plan view of the lower bearing member.

Referring more particularly to the drawings, the numeral 1 designates the side frames of a railway car truck, which side frames are, as usual, formed with window openings 2 into which extend the ends of the spring plank 3 carrying nests 4 of truck springs which support the truck bolster 5 which has its ends projecting through the window openings 2 in the customary manner.

The truck bolster may be, generally speaking, of substantially the construction shown in the application of Mark H. Martin, filed July 14, 1928, and given Serial Number 292,809 now U. S. Patent 1,806,075, May 19, 1931, or my co-pending application, filed April 5, 1927, Serial Number 181,161 now U. S. Patent 1,785,056, Dec. 16, 1930, and may be of any preferred detailed construction insofar as the cross sectional configuration, general dimensions, reinforcing webs, flanges, etc., are concerned. Furthermore, the bolster is provided centrally with a guide 6 at its top slidable longitudinally therealong as, for example, between side flanges 7, as illustrated in the above mentioned copending applications, this guide having a central opening 8 embracingly receiving the depending center plate 9 on the body bolster 10 so that lateral motion of the body bolster with respect to the truck may occur when the car passes onto or off from the curved track. Various details as to stop means for the guide and other features may be provided, for instance, as shown in said copending applications, if such are found advisable for any reason. The truck is also formed at points considerably outwardly of its vertical center and inwardly of the side frames with pockets 11 which are for the accommodation of the side bearing assembly constituting the subject matter of this invention.

Located within the bottom of each pocket 11 is a supporting or bearing block member 12 here disclosed as of more or less skeleton-like form, removably mounted and held against displacement by vertically extending ribs or webs 13 on the sides of the pocket. The bottom of the pocket is also preferably provided with an opening 14 through which a suitable implement might be inserted for the purpose of removing the element 12 if such is found desirable as for example in the event that it is necessary to install an element 12 of greater or less height for accomplishing proper adjustment of the relative positions of the parts. The skeleton formation of the member 12 and the opening 14 will permit the escape of any water or dirt that might otherwise accumulate in the bottom of the pocket. Mounted upon the element 12 is a lower bearing member 15 which has a plane or flat upper surface 16 and which has its lower surface partly curved and partly inclined, there being two arcuate surfaces 17 and 18 struck from radii 19 and 20 respectively and merging into each other. The inclined portions of the undersurface are indicated at 21 and 22 and extend tangentially with respect to the surfaces 17 and 18 respectively. This bearing member 15 is capable of rocking movement longitudinally of the bolster and to prevent it from displacement it is preferably provided within the curved area at its undersurface with a spud 23 received within a hole 24 in the member 12. At one end this bearing member has its side edges somewhat cut away as at 25 so as to cooperate with the guide ribs or webs 13 which will prevent it from twisting within the pocket. The pitch or slope of the inclined surfaces 21 and 22 is different and the reason for the specific curvature disclosed will be hereinafter explained.

Mounted upon the plane flat top surface 16 of the bearing member 15 is a rocker 26 which is capable of rocking movement transversely of the bolster and which has a cylindrically curved lower end 27 struck from the radius 28. To prevent displacement of the rocker with respect to the bearing member 15, the former is preferably provided at its lower end with one or more, preferably two, spuds 29 received within holes or recesses 30 in the latter. The rocker is not necessarily of solid form and is preferably of a more or less skeleton-like construction which may, if desired, be cruciform in cross section. The major portion of this rocker may be formed as an ordinary relatively soft steel casting and if desired the lower surface 27 may be hardened. However, it is very desirable that the top surface be extremely hard and for this reason the rocker is shown as having a top section 31, preferably formed of manganese steel or the like and bolted or riveted, as at 32, to the major portion, recesses 33 being provided for the accommodation of the heads at the upper ends of the rivets. This top section 31 has its upper surface 34 cylindrical, transversely of the bolster, and struck by the radius 35. Longitudinally of the bolster, this top surface is curved and struck by a long radius shown at 36 in Figure 4, the radius being, in actual practice, approximately seventy-two inches. At its extreme ends, the top surface 34 is relieved or rounded off with a rather abrupt curvature indicated by the radius 37. Naturally there is no distinct restriction as to the exact figure given for the curvature of the surface 34 longitudinally of the bolster as the intent is to obtain the benefits of a slightly spherical surface without the disadvantages of either a flat surface or one having a fairly abrupt curvature.

Cooperating with the rocker 26 is a top bearing member 38 which has its lower surface 39 plane or flat throughout its major portion, with relief curvatures 40 at the edges, and engaging upon the curved upper surface 34 of the rocker. It is intended that the bearing member 38 be movable with respect to the body bolster 10 without being capable of displacement and this may readily be accomplished by providing the member 38 with an upstanding spud 41 received within an opening 42 in a bearing member 43 carried by the body bolster, this bearing member 42 having a plane or flat undersurface 44. In the present instance the body bolster is shown as provided interiorly with a brace or stiffening member 45 provided at its lower end with a recess 46 into which the spud 41 projects. Displacement of the bearing member 38 with respect to the rocker may be prevented by providing the former with an opening 47 receiving a spud 48 on the latter. The shape of the spuds 23, 29 and 48 is not a matter of great importance and they may very conveniently all be tapered or substantially conical with rounded ends. However, as it is important that the bearing member 38 be incapable of any twisting or rotary movement with respect to the body bolster while capable of rocking movement longitudinally, it is for this reason that the spud 41 is represented as of angular or substantially frusto-pyramidal shape with the opening 42 of corresponding shape. The exact formation of the coacting parts to bring about this desired result may be established by computation or experiment and may be varied under certain circumstances.

The top surface of the bearing member 38 is curved but is, however, not a true cylinder but of compound or composite curvature, including an area 49 between the points 50 and 51 having a radius 52, which may conveniently be nine inches, an area 53 between the points 50 and 54 having a radius 55 which may conveniently be approximately twenty-four inches, a surface 56 between the points 51 and 57 and having a radius 58, which may conveniently be approximately thirty-six inches, and having its edge portions relieved by more abrupt curvatures 59 and 60 extending from the points 54 and 57, respectively, to the adjacent edges. The figures given are simply illustrative and may be varied if such is desired though the curvatures thus defined have proved to be eminently satisfactory.

When the structure is assembled as indicated it will be observed that the support for the body bolster afforded by the top bearing member 38 is considerably inwardly of the support for the rocker assembly afforded by the engagement of the bottom bearing member 15 with the bearing block 12. In other words a line passing through the spuds 23 and 41, or in other words through the centers of the areas of engagement of the block 12 with the bearing member 15 and of the bearing member 38 with the bearing member 43, will incline upwardly toward the prolonged vertical axis of the truck, thereby giving the same supporting effect, in principle, as exists with depending suspension links such as are used in passenger car trucks. The degree of inclination of this line is naturally dependent upon the exact location of the normal bearing points, lines or areas, which are in turn dependent upon the precise curvature provided and which may logically be subject to a certain degree of variation in this respect if found necessary. Furthermore, in actual practice, the distance between the vertical center line of the truck and the lines of bearing between the members 12 and 15, and 38 and 43, is less than the usual corresponding distance in standard truck assemblies as I have found that it is generally of advantage to draw in the points of support for the car as greater freedom of movement of the truck parts is thus permitted and as there is consequently a less racking effect on the car body when passing over a curved track, especially in the event of superelevation of the outer rail at a curve as is frequently present in trackways in and about factories, freight yards and numerous other places. To offset any possible slight decrease in stability resulting from this drawing inward of the points of support, the truck bolster may be equipped with stops 61 adapted to be engaged by other stops 62 on the body bolster, these stops coming into contact in the event of excessive lateral throw of the car body. The danger of derailment even under the most adverse conditions will therefore be greatly reduced and will be materially less than with the ordinary type of truck construction.

As the various curved and inclined surfaces above described are of great importance and as it is essential that they be disposed in the proper relation, I have found it advisable to construct the parts in such manner that incorrect assembly will be impossible. It will therefore be observed that the spud 23 and hole 24 are arranged eccentrically of the bearing member 15 and block 12 respectively, that the spud 48 on the rocker is likewise eccentric, and that the rocker 26 is provided with a lateral lug or spud 63 accommodated within an opening 64 in the inner transverse wall 65 of the pocket, it being impossible to arrange the rocker in reversed relation as the spud 63 would then strike against the edge of the opening 66 in the outer transverse wall 67 of the pocket, the opening 66 being of insufficient depth to accommodate the spud. This is a detail feature of some importance. There are also other details principally of refinement such as the shape of the holes 24 and 47 which receive the spuds 23 and 48, as well as the holes 30 which receive the spuds 29, it being of course clear that the size and shape of these various spud receiving openings must be such as to permit the necessary relative movement of the parts without binding and without danger of shearing off the spuds under any circumstances.

In the operation, it will be seen that under normal conditions the body bolster 10 will remain in parallel relation to the truck bolster. When simple relative swivelling movement of the truck and body bolsters occurs, pivoting will take place at the center plate 9 and opening 8 in the guide 6. At the same time, the rockers 26 will rock transversely of the bolsters, their bottom surfaces 27 rolling upon the flat top surfaces 16 of the bearing members 15, and the combined cylindrical and spherical upper surfaces 34 rolling beneath the flat surfaces 39 of the upper bearing members 38, the spuds 29 and 48 having sufficient freedom or play within the openings 30 and 47 to permit the movement without binding. When passing on to or off from a curved track it is quite well known that there is a tendency for the car body to shift laterally with respect to the trucks, this resulting in lateral motion of the body bolster generally at the same time that the relative swivelling movement takes place, though not necessarily, as it may occur as the result of passage of the wheels over a low spot in the track which will cause lateral shifting of the car body and lateral motion of the body bolster. Regardless of the cause, it will be seen that when the body bolster shifts laterally of the truck, the members 15 will rock longitudinally thereof, as will also the bearing members 38 and the rockers 26. When there is relative swivelling movement of the bolsters accompanied by the lateral motion it is apparent that in addition to the foregoing movements the rockers 26 will also rock transversely of the truck bolster, the combined spherical and cylindrical surfaces 34 rolling beneath the flat undersurfaces 39 and the cylindrical lower surfaces 27 of the rockers rolling upon the flat surfaces 16 of the lower bearing members 15. This combination of movements permits lateral motion of the body bolster simultaneously with the relative swivelling movement without binding and without any opposition other than a lifting effect on both ends of the bolster with the lift at the outer end greater than that at the inner end. This differential lifting action is the result of the peculiar formation of the top surface of the upper bearing member 38 and the bottom surface of the lower bearing member 15. As is pointed out above, the curved area 18 at the bottom of the lower bearing member 15 has a greater radius than the surface 17 and the flat surface 22 has a less inclination with respect to the horizontal than the flat surface 21. In other words the flat surface 22 has less pitch than the flat surface 21, or in other words these two surfaces compared with each other may be said to have a differential pitch. It is consequently apparent that assuming the body bolster 10 moves laterally toward the right, when viewing Figure 1, the relatively long and gradually curved surface 18 of the right lower bearing member 15 rolling upon the flat top of the block 12 will elevate the right end of the body bolster to a greater extent than the left end which is elevated only slightly by rolling of the shorter and more abruptly curved surface 17 of the left rocker upon its supporting block 12. The relative lengths and the difference between the curvatures of these surfaces 17 and 18 will be clearly apparent from an inspection of Figure 5. If the body bolster moves in the opposite direction, the reverse is true. This action is also assisted by the peculiar relation of the curvatures at the top surfaces of the upper bearing members 38. After either lateral motion alone or, as is generally the case, combined lateral and swivelling movements have taken place, this differential in the lifting effect on the two ends of the body bolster will enable or cause gravity to return the parts to their normal or intermediate positions upon the cessation of the force tending to produce such movements. The bringing about of the lifting action upon the occurrence of lateral motion, combined with the offsetting of the normal bearing line above described will give stability under all conditions without any necessity for the provision of extraneous or auxiliary features which are provided in some constructions to resist relative movement of the parts. There is consequently no moment to be overcome resulting in a slam when it is open. Wear, shock and strain on the parts of the truck itself and also on the car body and its lading will therefore be greatly reduced, resulting in longer lived equipment and more satisfactory transportation of goods, particularly of a perishable nature.

From the foregoing description and a study of the drawings, it will thus be apparent that I have provided a simply constructed arrangement having all the desirable features hereinbefore enumerated and one, moreover, in which the side bearing assembly might conceivably be installed in the pockets of an already existing bolster without any material alterations. Absolute freedom of movement is obtained under different conditions existing in service so that there is in effect a free floating action which will be highly beneficial in every respect. It is believed that the construction, operation and advantages will be readily apparent to one skilled in the art without further explanation.

While I have shown and described the preferred embodiment of the invention, it should be understood that the disclosure is merely an exemplification of the principles involved and that the right is reserved to make all such changes in the construction and also the combination and arrangement of parts as will not depart from the salient features of the invention or the scope of the claims hereunto appended.

Having thus described the invention, I claim:

1. In combination, a truck bolster having guide means thereon, a body bolster having a pivotal connection with said guide means, said guide means being slidably mounted on the truck bolster, said truck bolster being formed with pockets, and a side bearing assembly located within each pocket and embodying a plurality of coacting elements the upper and lower ones of which have curved surfaces bearing respectively against the body and truck bolsters at different distances from the vertical axis of the bolster.

2. In combination, a truck bolster, a body bolster having a pivotal and slidable connection therewith at the center, pockets in the truck bolster, and a side bearing assembly within each pocket and formed as a plurality of coacting elements certain of which are mounted for rocking movement laterally of the bolsters and others of which are mounted for rocking movement longitudinally of the bolsters, said side bearing assemblies supporting the body bolster and lifting both ends thereof but lifting the outer end to a greater extent than the inner when lateral motion occurs.

3. In combination, a truck bolster, a body bolster having a pivotal and slidable connection therewith at the center, the truck bolster being formed with pockets, and a side bearing assembly within each pocket for supporting the body bolster, the assembly including a plurality of relatively movable elements capable of movement in directions at substantially right angles to each other, one element having an active face including surfaces of different inclinations.

4. In combination, a truck bolster, a body bolster having a pivotal and slidable connection therewith at the center, the truck bolster being formed with pockets, and a side bearing assembly within each pocket for supporting the body bolster, the assembly including a plurality of relatively movable elements capable of movement in directions at substantially right angles to each other and certain of said elements normally bearing against the body and truck bolsters at points out of vertical alinement with the top bearing points located closely to the vertical axis of the bolsters.

5. In combination, a truck bolster, a body bolster having a pivotal and slidable connection therewith at the center, and side bearing assemblies carried by the truck bolster for supporting the body bolster, each side bearing assembly including upper and lower members rockable longitudinally of the bolsters and further including an intermediate member rockable transversely of the bolsters, said upper and lower members normally engaging the body and truck bolsters at lines lying in a plane inclined upwardly toward a prolongation of the vertical axis of the bolsters.

6. In combination, a truck bolster, a body bolster having a pivotal and slidable connection with the center thereof, the truck bolster being formed with pockets, and a side bearing assembly within each pocket for supporting the truck bolster, each assembly including upper and lower members having a line contact at all times with the body and truck bolsters respectively, and further including an intermediate member having a line contact with the lower member and a substantially point contact with the underside of the upper member.

7. In combination, a truck bolster, a body bolster having a pivotal and slidable connection with the center thereof, the truck bolster being formed with pockets, and a side bearing assembly within each pocket for supporting the truck bolster, each assembly including upper and lower members having a line contact at all times with the body and truck bolsters respectively, and further including an intermediate member having a line contact with the lower member and a substantially point contact with the underside of the upper member said intermediate member having a substantially cylindrical lower surface and the lower member having a flat top surface cooperating therewith.

8. In a side bearing assembly for interposition between a truck bolster and a body bolster mounted for relative swiveling movement and lateral motion, a plurality of superposed elements the upper and lower ones of which are rockable simultaneously longitudinally of the bolster with a line contact therewith at all times, and the intermediate one of which has a lateral rocking contact with the lower element with a spherical surface at its upper end having a rolling contact with the underside of the upper element.

9. In combination, a truck bolster, a body bolster having a pivotal and slidable connection with the center thereof, and side bearing assemblies mounted on the truck bolster for supporting the body bolster, each assembly including a lower bearing member having a curved undersurface rockable longitudinally of the truck bolster and having a flat top surface, each assembly further including an intermediate member with a cylindrical lower surface rockable transversely upon the top of said lower member and having a spherical upper surface, each assembly also including a top member with a flat undersurface engaging upon said spherical surface and having a curved top surface having rocking movement longitudinally of the body bolster against the underside thereof.

10. In combination, a truck bolster, a body bolster having a pivotal and slidable connection with the center thereof, and side bearing assemblies mounted on the truck bolster for supporting the body bolster, each assembly including a lower bearing member having a curved undersurface rockable longitudinally of the truck bolster and having a flat top surface, each assembly further including an intermediate member with a cylindrical lower surface rockable transversely upon the top of said lower member and having a spherical upper surface, each assembly also including a top member with a flat undersurface engaging upon said spherical surface and having a curved top surface having rocking movement longitudinally of the body bolster against the underside thereof each assembly further including means for preventing relative twisting of the intermediate member with respect to the upper and lower members.

11. In combination, a truck bolster, a body bolster having a pivotal and slidable connection with the center thereof, pockets in the truck bolster, and a side bearing assembly in each pocket including a lower member rockable longitudinally of the truck bolster and restrained against transverse movement with respect thereto, an upper member rockable longitudinally of the body bolster and restrained against transverse movement with respect thereto, and an interposed rocker movable transversely of the truck bolster and having a spherical upper end cooperating with the underside of and having rolling engagement with said upper member.

12. In combination, a truck bolster, a body bolster having a pivotal and slidable connection with the center thereof, pockets in the truck bolster, and a side bearing assembly in each pocket including a lower member rockable longitudinally of the truck bolster and restrained against transverse movement with respect thereto, an upper member rockable longitudinally of the body bolster and restrained against transverse movement with respect thereto, and an interposed rocker movable transversely of the truck bolster and having a spherical upper end cooperating with the underside of and having rolling engagement with said upper member said upper member having an opening, and said rocker having a spud received within said opening for preventing disassociation of the rocker with respect to said member.

13. In combination, a truck bolster, a body bolster mounted thereon at its center, and side bearings means interposed between said bolsters and located at a distance from the vertical axis of the truck less than one-half the distance from the vertical axis to the end of the bolsters, the points of bearing of said side bearings on the truck bolster being farther away from the vertical axis of the truck than the points of bearing against the body bolster, and coacting stop means on the truck and body bolsters outwardly beyond the side bearing means.

14. In combination, a truck bolster, a body bolster mounted thereon at its center, and side bearing means interposed between the bolsters, the axes of said side bearing means converging upwardly, said side bearing means being located closer to the center of the bolsters than to the ends, and safety coacting stop means on the bolsters located outwardly beyond the side bearing means.

15. In combination, a truck bolster, a body bolster mounted thereon at its center, and a pair of composite side bearings interposed between the bolsters and having their upper ends contacting with the body bolster at locations inwardly of the points of contact of their lower ends, to increase the stability, and coacting stop means on the bolsters outwardly of the side bearings.

16. In combination, a truck bolster, a body bolster mounted thereon at its center, and a pair of composite side bearings interposed between the bolsters and having their upper ends contacting with the body bolster at locations inwardly of the points of contact of their lower ends, each of said side bearings including a plurality of relatively movable coacting elements.

17. In combination, a truck bolster, a body bolster mounted thereon at its center, and a pair of composite side bearings interposed between the bolsters and having their upper ends contacting with the body bolster at locations inwardly of the points of contact of their lower ends, each of said side bearings including a plurality of relatively movable coacting elements certain of which have active faces of different angularity for effecting a differential lifting of the respective ends of the body bolster when lateral motion occurs.

18. In a railway car truck, a truck bolster, a body bolster slidably and pivotally mounted thereon, pockets formed in the truck bolster, and a side bearing assembly within each pocket for sustaining the load, each assembly including a plurality of relatively movable rocker elements certain of which move longitudinally and the others transversely with respect to the truck bolster, the longitudinally movable rocker elements having their curved surfaces of more gradual curvature outwardly of the lines of engagement with the bottom of the pocket for producing a differential lifting action of the ends of the bolster upon the occurrence of lateral motion.

19. In a railway car truck, a truck bolster formed with pockets, a body bolster slidably and pivotally connected with the truck bolster, depending bearing elements on the body bolster, and a side bearing assembly within each pocket and including relatively movable elements all of which have curved surfaces and certain of which have longitudinally extending inclined surfaces constituting continuations of the ends of the curved surfaces, the inclined surfaces toward the center of the truck being of less pitch than those toward the sides of the truck for effecting elevation of both ends of the body bolster but greater elevation of the outer end of the body bolster than the inner end thereof upon the occurrence of lateral motion of the body bolster.

20. In a railway car truck, a truck bolster provided with pockets, a body bolster pivotally and slidably mounted on the truck bolster and carrying depending bearing elements, a stationary bearing member within the bottom of each pocket, and a side bearing assembly in each pocket including a lower member rockable longitudinally of the truck bolster upon said stationary bearing member and having its undersurface curved and inclined at different angles from its line of contact therewith, said bearing assembly further including an upper rocker member movable transversely of the truck bolster upon the flat top surface of the lower rocker member and having its top surface substantially spherical transversely of the bolsters and of relatively slight curvature longitudinally thereof and cooperating with said depending bearing element.

21. In a railway car truck, a truck bolster provided with pockets, a body bolster pivotally and slidably mounted on the truck bolster and carrying depending bearings elements, a stationary bearing member within the bottom of each pocket, a side bearing assembly in each pocket including a lower member rockable longitudinally of the truck bolster upon said stationary bearing member and having its undersurface curved and inclined at different angles from its line of contact therewith, said bearing assembly further including an upper rocker member movable transversely of the truck bolster upon the flat top surface of the lower rocker member and having its top surface substantially spherical transversely of the bolsters and of relatively slight curvature longitudinally thereof and cooperating with said depending bearing element, and means on the upper rocker member having interfitting engagement with the depending bearing element for preventing relative movement other than rocking or torsional.

22. In a railway car truck, a truck bolster, a body bolster slidably and pivotally mounted thereon, pockets formed in the truck bolster, and a side bearing assembly within each pocket for sustaining the load, each assembly including a plurality of relatively movable rocker elements certain of which move longitudinally and the others transversely with respect to the truck bolster, the longitudinally movable elements having their lower surfaces of differential curvature and inclination at opposite sides of the line of support.

23. In a railway car truck, a truck bolster, a body bolster slidably and pivotally mounted thereon, and side bearing assemblies interposed between the truck and body bolsters and each including a plurality of rocker members movable relatively in directions at right angles to each other, the lower rocker element being supported upon the truck bolster and having a theoretical line contact therewith and having its bolster engaging surfaces of different pitch at opposite sides of the line of contact.

24. In a railway car truck, truck and body bolsters connected for relative slidable and pivotal movement, and side bearing assemblies interposed between the bolsters and each including a series of superposed elements relatively movable, the lowermost element being rockable longitudinally of the truck bolster and having the innermost and outermost portions of its bolster engaging surface of different curvature.

25. In a side bearing assembly adapted for interposition between the truck and body bolsters of a railway car truck, the combination of a plurality of superposed relatively movable rocker elements, the lowermost rocker element being adapted to rock longitudinally of the bolsters and the uppermost element being adapted to rock transversely thereof, the lowermost element having its rocker surface curved with inclined portions of different pitch extending from and merging into the opposite sides of the curved portion.

26. In a railway car truck, a truck bolster, a body bolster slidably and pivotally mounted thereon, and side bearing assemblies carried by the truck bolster for supporting the body bolster, each of said assemblies including relatively movable rocker elements having differentially curved operating surfaces, certain of the rocker elements having inclined surfaces constituting continuations of the ends of the curved surfaces, and certain of said inclined surfaces being of different pitch.

27. In a railway car truck, truck and body bolsters, means pivotally and slidably mounting the latter upon the former, and load sustaining side bearing assemblies interposed between said bolsters, each assembly including relatively movable rocker elements having compound curved operating surfaces and also inclined surfaces of differential pitch coacting with the truck and body bolsters for lifting the latter with respect to the former upon the occurrence of lateral motion thereof.

28. In a railway car truck, truck and body bolsters, means pivotally and slidably mounting the latter upon the former, and load sustaining side bearing assemblies interposed between said bolsters, each assembly including relatively movable rocker elements having compound curved operating surfaces and also inclined surfaces of differential pitch coacting with the truck and body bolsters for lifting the latter with respect to the former upon the occurrence of lateral motion thereof and for lifting the outer end thereof to a greater extent than the inner end.

THOMAS H. SYMINGTON.